(12) United States Patent
Tian et al.

(10) Patent No.: US 10,910,014 B2
(45) Date of Patent: Feb. 2, 2021

(54) METHOD AND APPARATUS FOR GENERATING VIDEO

(71) Applicants: Baidu USA LLC, Sunnyvale, CA (US); Baidu.com Times Technology (Beijing) Co., Ltd., Beijing (CN)

(72) Inventors: Hao Tian, Sunnyvale, CA (US); Darning Lu, Sunnyvale, CA (US); Xi Chen, Sunnyvale, CA (US); Jeff Chienyu Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/703,717

(22) Filed: Dec. 4, 2019

(65) Prior Publication Data
US 2020/0321026 A1    Oct. 8, 2020

(30) Foreign Application Priority Data
Apr. 8, 2019    (CN) .......................... 2019 1 0277152

(51) Int. Cl.
| H04N 9/80 | (2006.01) |
| G11B 27/031 | (2006.01) |
| G06F 40/30 | (2020.01) |
| G06F 16/438 | (2019.01) |
| G11B 27/00 | (2006.01) |
| H04N 9/87 | (2006.01) |
| G06F 40/205 | (2020.01) |
| H04N 5/93 | (2006.01) |

(52) U.S. Cl.
CPC .......... *G11B 27/031* (2013.01); *G06F 16/438* (2019.01); *G06F 40/205* (2020.01); *G06F 40/30* (2020.01); *G11B 27/002* (2013.01); *H04N 9/87* (2013.01)

(58) Field of Classification Search
CPC ..... G11B 27/031; G11B 27/002; G06F 40/30; G06F 40/205; G06F 16/438; H04N 9/87
USPC ................. 386/241, 278, 281, 243, 248, 262
See application file for complete search history.

(56) References Cited

U.S. PATENT DOCUMENTS

2009/0234842 A1* 9/2009 Luo .......................... G06F 16/58
2019/0281130 A1* 9/2019 Spagnola ............. H04L 67/2852

* cited by examiner

Primary Examiner — Robert Chevalier
(74) Attorney, Agent, or Firm — Seed IP Law Group LLP

(57) ABSTRACT

Embodiments of the present disclosure provide a method and apparatus for generating a video. The method may include: receiving a query text inputted by a user; querying a material resource set related to the query text, material resources being images, videos, or audios; presenting the material resource set; determining a material resource sequence, in response to receiving a selecting operation and a ranking operation of the user on the material resources in the presented material resource set; and generating the video based on the material resource sequence.

20 Claims, 9 Drawing Sheets

METHOD AND APPARATUS FOR GENERATING VIDEO

CROSS-REFERENCE TO RELATED APPLICATIONS

This application claims priority to Chinese Patent Application No. 201910277152.9, filed on Apr. 8, 2019, titled "Method and apparatus for generating video," which is hereby incorporated by reference in its entirety.

TECHNICAL FIELD

Embodiments of the present disclosure relate to the field of computer technology, and specifically to a method and apparatus for generating a video.

BACKGROUND

At present, in a process of making a video, a user often needs to manually photograph or make various material resources (including videos, audios, images, and subtitle words) required to generate the video.

SUMMARY

Embodiments of the present disclosure provide a method and apparatus for generating a video.

In a first aspect, an embodiment of the present disclosure provides a method for generating a video, including: receiving a query text inputted by a user; querying a material resource set related to the query text, material resources being images, videos, or audios; presenting the material resource set; determining a material resource sequence, in response to receiving a selecting operation and a ranking operation of the user on the material resources in the presented material resource set; and generating the video based on the material resource sequence.

In some embodiments, the querying a material resource set related to the query text includes: performing word segmentation on the query text to obtain a segmented term sequence corresponding to the query text; querying, for a segmented term in the segmented term sequence, a material resource with a matching degree between the material resource and the segmented term greater than a preset matching degree threshold; and determining a found material resource for use as the material resource set.

In some embodiments, the querying a material resource with a matching degree between the material resource and the segmented term greater than a preset matching degree threshold includes: querying a material resource with a similarity between a corresponding semantic vector and a term vector of the segmented term greater than a first preset similarity threshold.

In some embodiments, the querying a material resource set related to the query text includes: querying a material resource with a similarity between a corresponding semantic vector and a semantic vector of the query text greater than a second preset similarity threshold; and determining a found material resource for use as the material resource set.

In some embodiments, the generating the video based on the material resource sequence includes: determining a video obtained by sequentially connecting each image and video material resource in the material resource sequence for use as a first video; determining an audio obtained by sequentially connecting each audio material resource in the material resource sequence for use as a first audio; and determining the first video and the first audio for use as a video part and an audio part in the generated video respectively.

In some embodiments, the generating the video based on the material resource sequence includes: querying a text query result with the similarity between a corresponding semantic vector and the semantic vector of the query text greater than a second preset similarity threshold; determining a digest of the text query result based on a found text query result; generating a voice corresponding to the digest of the text query result using a voice synthesis technology, for use as a second audio; sequentially connecting each image and video material resource in the material resource sequence to obtain a second video; and determining the second audio and the second video for use as an audio part and a video part in the generated video respectively.

In some embodiments, the method further includes: playing the generated video, in response to receiving a playing request for instructing to play the generated video.

In a second aspect, an embodiment of the present disclosure provides an apparatus for generating a video, including: a receiving unit configured to receive a query text inputted by a user; a querying unit configured to query a material resource set related to the query text, material resources being images, videos, or audios; a presenting unit configured to present the material resource set; a determining unit configured to determine a material resource sequence, in response to receiving a selecting operation and a ranking operation of the user on the material resources in the presented material resource set; and a generating unit configured to generate the video based on the material resource sequence.

In some embodiments, the querying unit includes: a word segmenting module configured to perform word segmentation on the query text to obtain a segmented term sequence corresponding to the query text; a first querying module configured to query, for a segmented term in the segmented term sequence, a material resource with a matching degree between the material resource and the segmented term greater than a preset matching degree threshold; and a first determining module configured to determine a found material resource for use as the material resource set.

In some embodiments, the first querying module is further configured to: query a material resource with a similarity between a corresponding semantic vector and a term vector of the segmented term greater than a first preset similarity threshold.

In some embodiments, the querying unit includes: a second querying module configured to query a material resource with a similarity between a corresponding semantic vector and a semantic vector of the query text greater than a second preset similarity threshold; and a second determining module configured to determine a found material resource for use as the material resource set.

In some embodiments, the generating unit includes: a third determining module configured to determine a video obtained by sequentially connecting each image and video material resource in the material resource sequence for use as a first video; a fourth determining module configured to determine an audio obtained by sequentially connecting each audio material resource in the material resource sequence for use as a first audio; and a fifth determining module configured to determine the first video and the first audio for use as a video part and an audio part in the generated video respectively.

In some embodiments, the generating unit includes: a third querying module configured to query a text query result with the similarity between a corresponding semantic vector and the semantic vector of the query text greater than a second preset similarity threshold; a sixth determining module configured to determine a digest of the text query result based on the found text query result; a voice synthesizing module configured to generate a voice corresponding to the digest of the text query result using a voice synthesis technology, for use as a second audio; a connecting module configured to sequentially connect each image and video material resource in the material resource sequence to obtain a second video; and a seventh determining module configured to determine the second audio and the second video for use as an audio part and a video part in the generated video respectively.

In some embodiments, the apparatus further includes: a playing unit configured to play the generated video, in response to receiving a playing request for instructing to play the generated video.

In a third aspect, an embodiment of the present disclosure provides a server, including: one or more processors; and a storage apparatus, storing one or more programs thereon, where the one or more programs, when executed by the one or more processors, cause the one or more processors to implement the method according to any implementation in the first aspect.

In a fourth aspect, an embodiment of the present disclosure provides a computer readable storage medium, storing a computer program thereon, where the computer program, when executed by one or more processors, implements the method according to any implementation in the first aspect.

In a fifth aspect, an embodiment of the present disclosure provides another server, including: an interface, a storage storing one or more program, and one or processors operatively connected to the interface and the storage and configured to: receive a query text inputted by a user; query a material resource set related to the query text, material resources being images, videos, or audios; present the material resource set; determine a material resource sequence, in response to receiving a selecting operation and a ranking operation of the user on the material resources in the presented material resource set; and generate the video based on the material resource sequence.

In a sixth aspect, an embodiment of the present disclosure provides a computer readable storage medium, storing a computer program thereon, wherein the computer program, when executed by one or more processors, causes the one or more processors to: receive a query text inputted by a user; query a material resource set related to the query text, material resources being images, videos, or audios; present the material resource set; determine a material resource sequence, in response to receiving a selecting operation and a ranking operation of the user on the material resources in the presented material resource set; and generate the video based on the material resource sequence.

At present, in the process of making the video, the user often needs to manually photograph or make various material resources (including videos, audios, and images) required to generate the video, thus resulting in high video making costs (including hardware costs, video making experience costs, time costs, and the like). The method and apparatus for generating a video according to embodiments of the present disclosure first receive a query text inputted by a user, then query a material resource set related to the query text, material resources being images, videos, or audios, then present the material resource set, then receive a selecting operation and a ranking operation of the user on the material resources in the presented material resource set, determine a material resource sequence, and finally generate the video based on the material resource sequence, thereby providing the material resources for the user based on the query text inputted by the user, generating the video based on the selecting operation and the ranking operation of the user on the provided material resources, and reducing the costs of generating the video by the user.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described below in detail with reference to the accompanying drawings and in combination with the embodiments.

Figure 1:
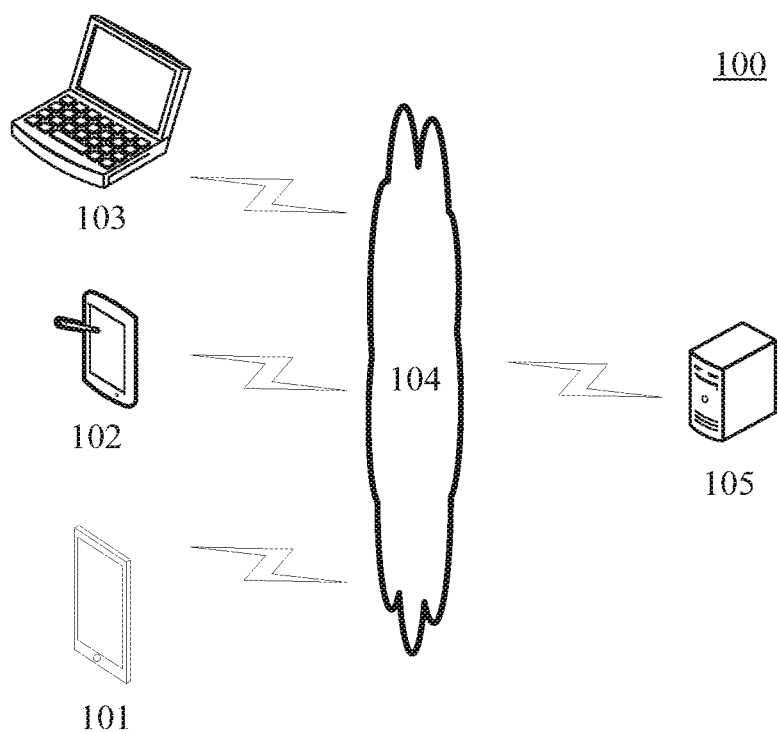
FIG. 1 is a diagram of an example system architecture in which some embodiments of the present disclosure may be implemented.

FIG. 1 shows an example system architecture 100 in which a method for generating a video or an apparatus for generating a video of embodiments of present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as a video generating application, a web browser application, a shopping application, a search application, an instant messaging tool, an email client, and social platform software.

The terminal devices 101, 102, and 103 may be hardware or software. When the terminal devices 101, 102 and 103 are hardware, the terminal devices may be various electronic devices having a display screen, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, the terminal devices may be installed in the above-listed electronic devices, or be implemented as a plurality of software programs or software modules, or be implemented as a single software program or software module. This is not specifically limited here.

The server 105 may be a server providing various services, such as a back-end server providing support for a video generating application displayed on the terminal devices 101, 102, and 103. The back-end server may process, e.g., analyze, received data, such as a video generating request including a query text, and return the processing result (e.g., a material resource set) to the terminal devices.

It should be noted that the server 105 may be hardware or software. When the server 105 is hardware, the server may be implemented as a distributed server cluster composed of a plurality of servers, or be implemented as a single server. When the server 105 is software, the server may be implemented as a plurality of software programs or software modules (e.g., software programs or software modules for providing a video generating service), or be implemented as a single software program or software module. This is not specifically limited here.

It should be noted that the method for generating a video according to some embodiments of the present disclosure is generally executed by the server 105. Accordingly, the apparatus for generating a video is generally provided in the server 105.

It should be noted that the server 105 may alternatively locally receive the query text inputted by the user, and finally generate the video. In this case, the example system architecture 100 may not include the terminal devices 101, 102, and 103, and the network 104.

It should be further noted that, the terminal devices 101, 102, and 103 may also locally query the material resource set related to the query text. In this case, the method for generating a video may alternatively be executed by the terminal devices 101, 102, and 103. Accordingly, the apparatus for generating a video may also be provided in the terminal devices 101, 102, and 103. In this case, the example system architecture 100 may not include the server 105 and the network 104.

It should be noted that the method for generating a video according to some embodiments of the present disclosure may be executed by the server 105. Accordingly, the apparatus for generating a video may also be provided in the server 105. In this case, the example system architecture 100 may not include the terminal devices 101, 102, and 103, and the network 104 The method for generating a video according to some embodiments of the present disclosure may also be executed by the terminal devices 101, 102, and 103. Accordingly, the apparatus for generating a video may also be provided in the terminal devices 101, 102, and 103. In this case, the example system architecture 100 may not include the server 105 and the network 104. The method for generating a video according to some embodiments of the present disclosure may alternatively be executed jointly by the server 105 and the terminal devices 101, 102, and 103. For example, a step of "querying a material resource set related to the query text" may be executed by the server 105, and other steps may be executed by the terminal devices 101, 102, and 103. This is not specifically limited herein.

It should be understood that the numbers of terminal devices, networks, and servers in FIG. 1 are merely illustrative. Any number of terminal devices, networks, and servers may be provided based on actual requirements.

Figure 2A:
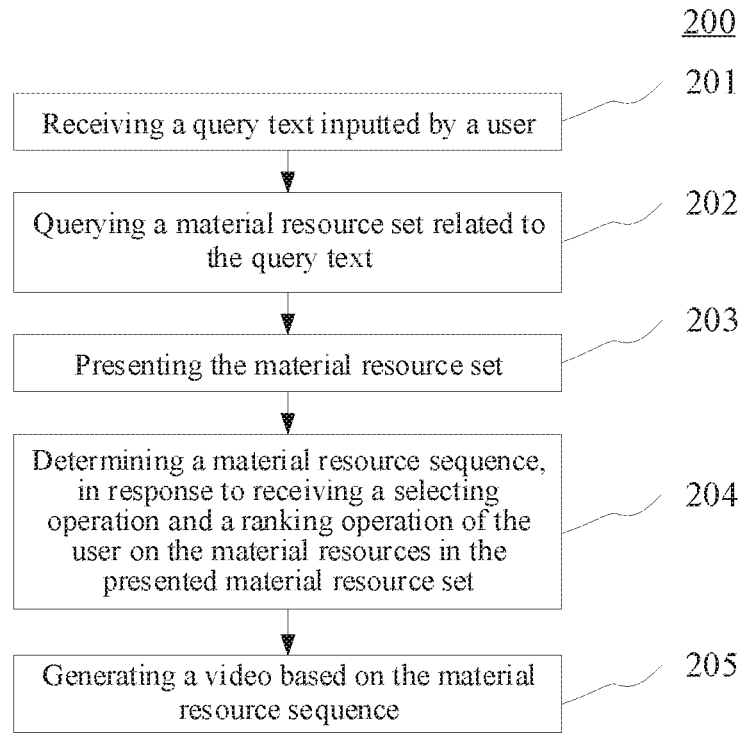
FIG. 2A is a flowchart of a method for generating a video according to an embodiment of the present disclosure.

Further referring to FIG. 2A, a process 200 of a method for generating a video according to an embodiment of the present disclosure is shown. The method for generating a video includes the following steps.

Step 201: receiving a query text inputted by a user.

In some alternative implementations of the present embodiment, an executing body (e.g., the server or the terminal device shown in FIG. 1) of the method for generating a video may locally receive the query text inputted by the user.

In some alternative implementations of the present embodiment, the executing body also remotely receives the query text inputted by the user from a terminal device connected to the executing body via a network.

Step 202: querying a material resource set related to the query text.

In the present embodiment, the executing body may query a material resource set related to the query text received in step 201 by various implementations. The material resources here may be images, videos, or audios.

In some alternative implementations of the present embodiment, step 202 may be performed as follows: capturing webpages related to the query text on a plurality of websites using a web crawler, and determining images, videos and audios in the captured webpages for use as the found material resource set.

Figure 2B:
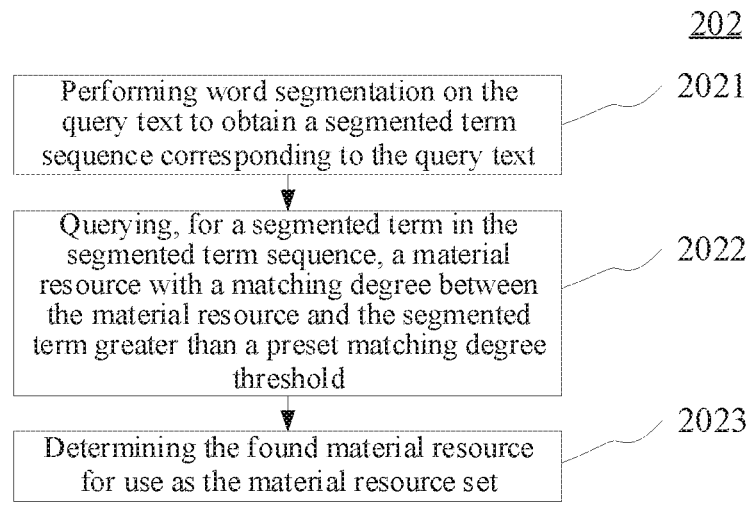
FIG. 2B is a resolved flowchart of step 202 according to an embodiment of the present disclosure.

In some alternative implementations of the present embodiment, step 202 may further include step 2021 to step 2023 shown in FIG. 2B. Referring to FIG. 2B, a resolved flowchart of step 202 according to an embodiment of the present disclosure is shown.

Step 2021: performing word segmentation on the query text to obtain a segmented term sequence corresponding to the query text.

Here, word segmentation on the query text may be performed by various implementations to obtain the segmented term sequence corresponding to the query text. Here, the segmented term sequence is composed of sequentially arranged at least one segmented term.

It should be noted that how to perform word segmentation on a text is a prior art that is widely researched and applied at present. The description will not be repeated here. For example, a dictionary-based word segmentation algorithm, a statistics-based word segmentation algorithm, or a rule-based word segmentation algorithm may be used.

Step 2022: querying, for a segmented term in the segmented term sequence, a material resource with a matching degree between the material resource and the segmented term greater than a preset matching degree threshold.

In some implementations, for each segmented term in the segmented term sequence obtained in step 2021, a material resource with a matching degree between the material resource and the segmented term greater than the preset matching degree threshold may be queried.

In some implementations, for a part of segmented terms in the segmented term sequence obtained in step 2021, a material resource with a matching degree between the material resource and each segmented term of the part of segmented terms greater than the preset matching degree threshold may be queried. For example, for each non-empty segmented term in the segmented term sequence, a material resource with a matching degree between the material resource and the non-empty segmented term greater than the preset matching degree threshold may be queried.

Here, since the material resource may be an image, video, or audio, a matching degree between a text and an image type material resource may be computed using various methods of computing a matching degree between a text and an image, a matching degree between a text and a video type material resource may be computed using various methods of computing a matching degree between a text and a video, and a matching degree between a text and an audio type material resource may be computed using various methods of computing a matching degree between a text and an audio. This is not specifically limited in the present disclosure.

In some implementations, a similarity between a term vector of the segmented term and a semantic vector of the material resource may be determined for use as the matching degree between the segmented term and the material resource. In this way, step 2022 may be performed as follows: querying, for the segmented term in the segmented term sequence, a material resource with a similarity between a corresponding semantic vector and a term vector of the segmented term greater than a first preset similarity threshold. Here, the similarity between the term vector of the segmented term and the semantic vector of the material resource may be computed using various methods of computing a similarity between vectors. For example, the similarity between the vectors may be determined by computing Euclidean distance, Manhattan distance, Chebyshev distance, Minkowski distance, standardized Euclidean distance, Mahalanobis distance, cosine similarity, Hamming distance, Jaccard distance, Jaccard similarity coefficient, correlation coefficient, correlation distance, information entropy, or the like between the vectors.

Here, the term vector of the segmented term may be determined by various implementations, i.e., expressing the segmented term as a vector form to facilitate computing.

For example, the term vector of the segmented term may be generated using a bag-of-words model. Specifically, assuming that V is the number of terms included in a dictionary in the bag-of-words model, then for a segmented term w, assuming that the numbers of a 1st term to a V-th term in a dictionary included in the segmented term w are $x_1$ to $x_v$ respectively, then a vector corresponding to the segmented term w is $\{x_1, x_2, \ldots, x_v\}$.

For another example, the term vector of the segmented term may be queried in a predetermined term vector table, where the term vector table is used for characterizing a corresponding relationship between terms and term vectors of the terms. The term vector table may be obtained by pre-training. For example, the term vector table may be obtained by training using a statistics-based approach or a language model-based approach.

For example, the statistics-based approach may be a co-occurrence matrix approach, which statisticizes the number of times of co-occurrence of terms within a window of a preset size, and uses the number of times of co-occurring terms around the terms for use as the term vector of the current term. Specifically, a co-occurrence matrix may be established from a large number of corpus texts to define a term vector corresponding to each term of terms occurring in the corpus texts, and then obtain a term vector table.

For another example, the statistics-based approach may further be a singular value decomposition approach. Because the co-occurrence matrix approach has high dimension and sparsity problems, the singular value decomposition approach decomposes a singular value of a matrix obtained by the co-occurrence matrix approach, to obtain an orthogonal matrix, then normalizes the orthogonal matrix to obtain a matrix to define the term vector corresponding to each term of the terms occurring in the corpus texts, and then obtains the term vector table.

The generating the term vector table based on a language model is performed by training a neural network language model (NNLM), and the term vector table is outputted accompanied with the language model. The basic idea behind the NNLM is to predict terms occurring in a context. This prediction on the context is essentially a kind of learning of statistical features of co-occurrence. As an example, the method of generating a term vector by the NNLM may include, but is not limited to, the following approaches: Skip-gram, CBOW, LBL, NNLM, C&W, GloVe, BERT (Bidirectional Encoder Representations from Transformers), GPT-2, and the like.

Figure 3:
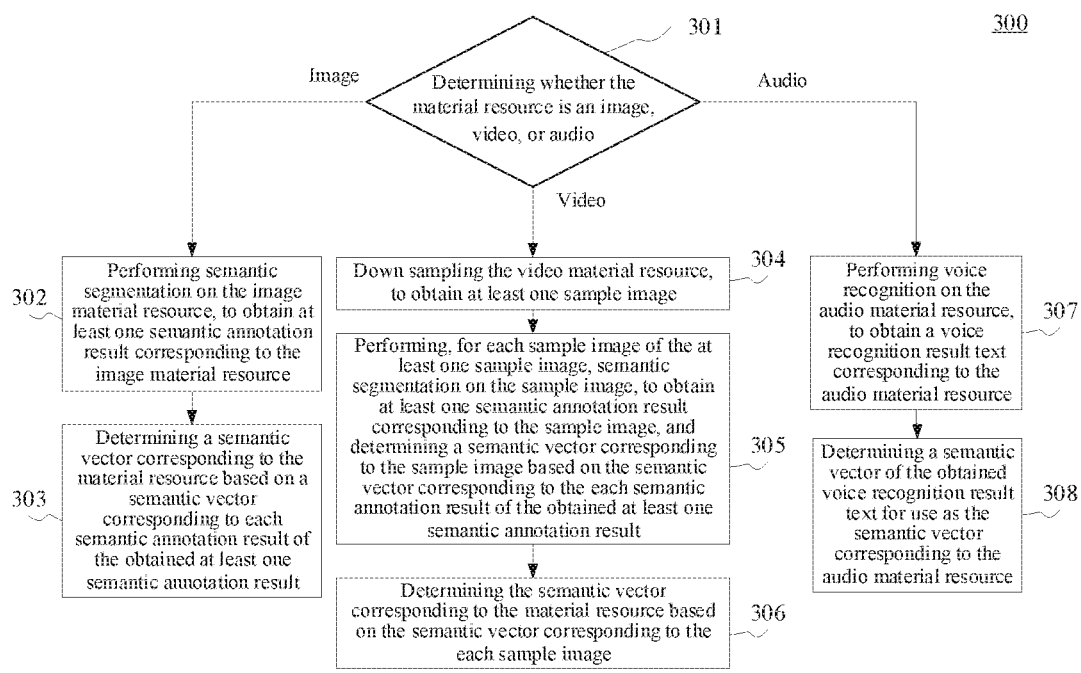
FIG. 3 is a flowchart of determining a semantic vector corresponding to a material resource according to an embodiment of the present disclosure.

In some implementations, determining a semantic vector corresponding to a material resource may include step 301 to step 308 shown in FIG. 3. Referring to FIG. 3, a flowchart of determining a semantic vector corresponding to a material resource according to an embodiment of the present disclosure is shown.

Step 301: determining whether the material resource is an image, video, or audio.

If it is determined that the material resource is the image, then step 302 is switched to.

If it is determined that the material resource is the video, then step 304 is switched to.

If it is determined that the material resource is the audio, then step 307 is switched to.

Step 302: performing semantic segmentation on the image material resource, to obtain at least one semantic annotation result corresponding to the image material resource.

Here, in the case where the material resource being the image is determined in step 301, semantic segmentation on the image material resource may be performed by various implementations, to obtain at least one semantic annotation result corresponding to the image material resource, where each semantic annotation result may be a term or phrase. For example, if the image material resource is an image describing a lion chasing an antelope on grassland, then at least one semantic annotation result obtained by semantic segmentation on the image may be {"lion," "grassland," "antelope"}.

It should be noted that how to perform semantic segmentation on an image is a prior art that is widely studied and applied at present. The description will not be repeated here.

Step 303: determining a semantic vector corresponding to the material resource based on a semantic vector corresponding to each semantic annotation result of the obtained at least one semantic annotation result.

At least one semantic annotation result has been obtained in step 302. Here, a term vector corresponding to each semantic annotation result of the at least one semantic annotation result obtained in step 302 may be first determined. Then, the semantic vector corresponding to the material resource may be determined based on the term vector corresponding to each semantic annotation result of the at least one semantic annotation result. For example, a mean vector or median vector of the term vector corresponding to each semantic annotation result of the at least one semantic annotation result may be determined for use as the semantic vector corresponding to the material resource. A term vector with a highest modulus or lowest modulus of the term vector corresponding to each semantic annotation result of the at least one semantic annotation result may be further determined for use as the semantic vector corresponding to the material resource.

Here, the method of determining the term vector corresponding to each semantic annotation result may refer to the related description in step 2022.

After step 303, the semantic vector corresponding to the image material resource is determined.

Step 304: down sampling the video material resource, to obtain at least one sample image.

Here, in the case where the material resource being the video is determined in step 301, the video material resource may be down sampled by various implementations, to obtain the at least one sample image. For example, a second preset number (e.g., 1) of frames of images may be sampled at intervals of a first preset number (e.g., 10) of frames of images in the material resource, to obtain the at least one sample image.

Step 305: performing, for each sample image of the at least one sample image, semantic segmentation on the sample image, to obtain at least one semantic annotation result corresponding to the sample image, and determining a semantic vector corresponding to the sample image based on the semantic vector corresponding to the each semantic annotation result of the obtained at least one semantic annotation result.

Here, specific operations of the performing semantic segmentation on each sample image, and determining a semantic vector corresponding to the each sample image based on the semantic vector corresponding to the each semantic annotation result of the obtained at least one semantic annotation result in step 305 are basically identical to corresponding specific operations described in step 303. The description will not be repeated here.

Step 306: determining the semantic vector corresponding to the material resource based on the semantic vector corresponding to the each sample image.

Because the semantic vector corresponding to each sample image is obtained in step 305, here, the semantic vector corresponding to the material resource may be determined based on the semantic vector corresponding to each sample image obtained in step 305. For example, a mean vector of the semantic vector corresponding to each sample image may be determined for use as the semantic vector corresponding to the material resource. For another example, a vector corresponding to a median of a value in each dimension of the semantic vector corresponding to each sample image may be further determined for use as the semantic vector corresponding to the material resource. For still another example, a semantic vector with a highest modulus or lowest modulus of the semantic vector corresponding to each sample image may be further determined for use as the semantic vector corresponding to the material resource.

After performing the step 306, the semantic vector corresponding to the video material resource is determined.

Step 307: performing voice recognition on the audio material resource, to obtain a voice recognition result text corresponding to the audio material resource.

It should be noted that voice recognition is a prior art that is widely studied and applied at present. The description will not be repeated here.

Step 308: determining a semantic vector of the obtained voice recognition result text for use as the semantic vector corresponding to the audio material resource.

Here, the semantic vector corresponding to the voice recognition result text may be determined by various implementations, i.e., expressing the voice recognition result text as a vector form to facilitate computing.

For example, the semantic vector corresponding to the voice recognition result text may be generated using a bag-of-words model. Specifically, assuming that V is the number of terms included in a dictionary in the bag-of-words model, then for a voice recognition result text T, assuming that the numbers of a 1st term to a V-th term in a dictionary included in the voice recognition result text T are $x_1$ to $x_v$ respectively, then a vector corresponding to the voice recognition result text T is $\{x_1, x_2, \ldots, x_v\}$.

For yet another example, a segmented term sequence corresponding to the voice recognition result text may be further obtained by word segmentation of the voice recognition result text, then a term vector corresponding to each segmented term in the obtained segmented term sequence is queried in a predetermined term vector table, and then a semantic vector corresponding to the voice recognition result text is determined based on the term vector corresponding to each segmented term in the obtained segmented term sequence. For example, a mean vector of the term vector corresponding to each segmented term in the obtained segmented term sequence may be determined for use as the term vector corresponding to the voice recognition result text. For another example, a vector corresponding to a median of a value in each dimension of the term vector corresponding to each segmented term in the obtained segmented term sequence may be further determined for use as the term vector corresponding to the voice recognition result text. Here, the term vector table is used for characterizing a corresponding relationship between a term and a term vector. The term vector table may be obtained by pre-training. For example, the term vector table may be obtained by training using a statistics-based approach or a language model-based approach.

After step 308, the semantic vector corresponding to the audio material resource is determined.

Step 2023: determining the found material resource for use as the material resource set.

Here, the material resource found in step 2022 may be determined for use as the material resource set.

Figure 2C:
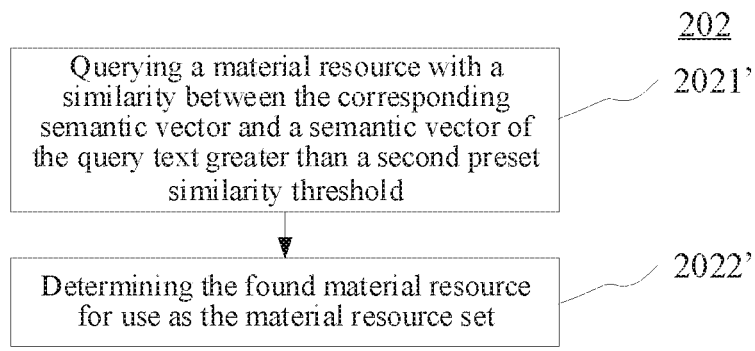
FIG. 2C is a resolved flowchart of step 202 according to another embodiment of the present disclosure.

In some alternative implementations of the present embodiment, step 202 may further include step 2021' to step 2022' shown in FIG. 2C. Referring to FIG. 2C, a resolved flowchart of step 202 according to another embodiment of the present disclosure is shown.

Step 2021': querying a material resource with a similarity between the corresponding semantic vector and a semantic vector of the query text greater than a second preset similarity threshold.

Here, the semantic vector corresponding to the material resource may be first determined, and then a material resource with a similarity between the corresponding semantic vector and a semantic vector of the query text greater than a second preset similarity threshold may be queried.

Related description of step 301 to step 308 in the embodiment shown in FIG. 3 may be referred to for how to determine a semantic vector corresponding to a material resource. The description will not be repeated here.

Related description on determining the semantic vector of the voice recognition result text in step 308 of the embodiment shown in FIG. 3 may be referred to for how to determine a semantic vector corresponding to a query text. The description will not be repeated here.

Step 2022': determining the found material resource for use as the material resource set.

Here, the material resource found in step 2021' may be determined for use as the material resource set.

Step 203: presenting the material resource set.

In the present embodiment, the executing body may present the material resource set by various implementations.

In some alternative implementations of the present embodiment, the executing body may locally present the material resource set.

In some alternative implementations of the present embodiment, the executing body may alternatively send the material resource set to the terminal device, and control the terminal device to present the received material resource set. Here, the terminal device may be identical to the terminal device receiving the query text inputted by the user in step 201.

Here, apart of the material resource in the material resource set may be presented each time, or all material resources in the material resource set may be presented each time. The image type material resource may be presented by presenting a thumbnail of the material resource, or presenting an original image of the material resource. The video type material resource may be presented by presenting a thumbnail or an original image of a first frame of a video image of the video material resource. The audio type material resource may be presented by presenting a thumbnail including the audio material resource, and the thumbnail of the audio material resource may include at least one of the following items: a playing duration, or an audio name of the audio material resource.

Step 204: determining a material resource sequence, in response to receiving a selecting operation and a ranking operation of the user on the material resources in the presented material resource set.

In the present embodiment, the executing body may determine the material resource sequence, in response to receiving the selecting operation and the ranking operation of the user on the material resources in the presented material resource set.

In some alternative implementations of the present embodiment, the executing body may locally receive the selecting operation and the ranking operation of the user on the material resources in the locally presented material resource set.

In some alternative implementations of the present embodiment, the executing body may also remotely receive the selecting operation and the ranking operation of the user on the material resources in the material resource set presented on the terminal device from the terminal device connected to the executing body via the network.

In the present embodiment, the selecting operation of the user on the material resources in the presented material resource set may be various operations. For example, the selecting operation may include, but is not limited to: click, drag, slide, and the like.

In the present embodiment, the ranking operation of the user on the material resources in the presented material resource set may also be various operations that can reflect a playing sequence between the material resources. For example, a timeline interface of the playing sequence between the material resources may be provided, and then a user's operation of dragging the thumbnails or the original images of the presented material resources to the timeline interface is received.

In the present embodiment, the executing body may determine the material resources corresponding to the selecting operation of the user for use as the material resources in the material resource sequence, and then determine ranking between each material resource in the material resource sequence based on a sequence between the material resources corresponding to the ranking operation of the user.

Step 205: generating a video based on the material resource sequence.

In the present embodiment, the executing body may generate the video based on the material resource sequence determined in step 204 by various implementations.

Figure 2D:
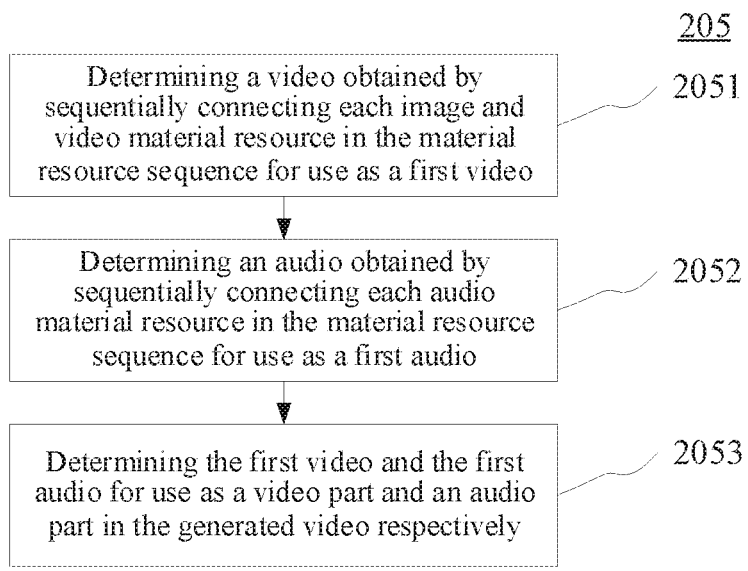
FIG. 2D is a resolved flowchart of step 205 according to an embodiment of the present disclosure.

In some alternative implementations of the present embodiment, step 205 may include step 2051 to step 2053 shown in FIG. 2D. Referring to FIG. 2D, a resolved flowchart of step 205 according to an embodiment of the present disclosure is shown.

Step 2051: determining a video obtained by sequentially connecting each image and video material resource in the material resource sequence for use as a first video.

Here, a playing duration of the image material resource in the generated video may be a preset image playing duration. That is, here, each image and video material resource in the material resource sequence may be connected in sequence of each image and video material resource in the material resource sequence.

Step 2052: determining an audio obtained by sequentially connecting each audio material resource in the material resource sequence for use as a first audio.

Here, each audio material resource in the material resource sequence may be connected in sequence of each audio material resource in the material resource sequence.

Step 2053: determining the first video and the first audio for use as a video part and an audio part in the generated video respectively.

Figure 2E:
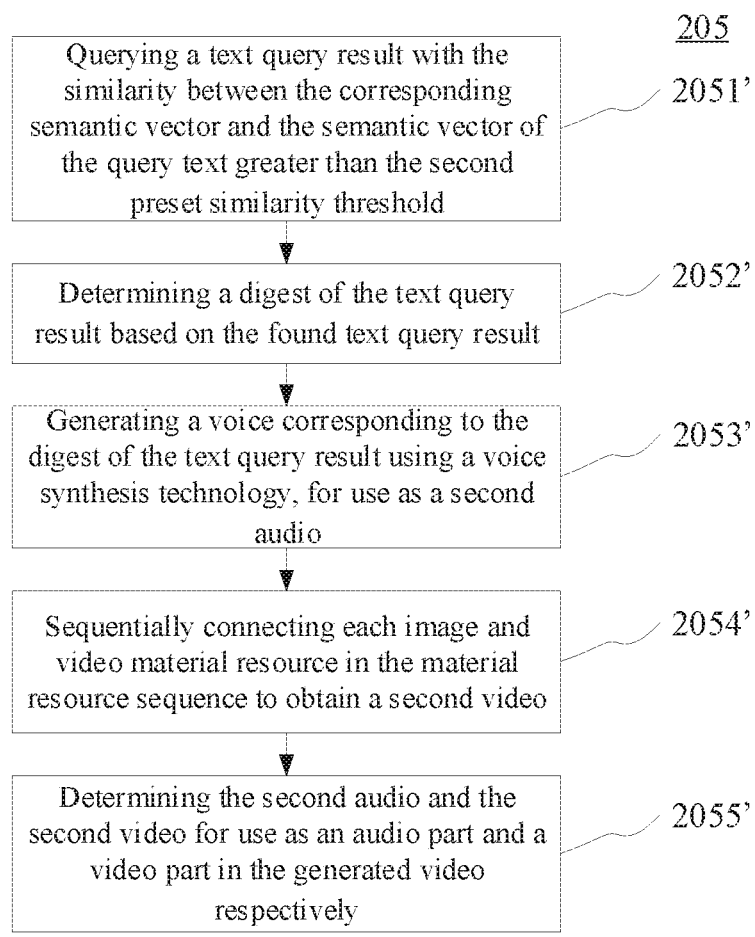
FIG. 2E is a resolved flowchart of step 205 according to another embodiment of the present disclosure.

In some alternative implementations of the present embodiment, step 205 may further include step 2051' to step 2055' shown in FIG. 2E. Referring to FIG. 2E, a resolved flowchart of step 205 according to another embodiment of the present disclosure is shown.

Step 2051': querying a text query result with the similarity between the corresponding semantic vector and the semantic vector of the query text greater than the second preset similarity threshold.

Here, the executing body may query the text query result with the similarity between the corresponding semantic vector and the semantic vector of the query text greater than the second preset similarity threshold by various implementations.

In some implementations, the executing body may capture the webpages related to the query text on the plurality of websites using the web crawler, and query the text query result with the similarity between the corresponding semantic vector and the semantic vector of the query text greater than the second preset similarity threshold in texts of the captured webpages.

Step 2052': determining a digest of the text query result based on the found text query result.

Here, the digest of the text query result may be determined based on the found text query result by various implementations.

In some implementations, the executing body may first present the text query result found in step 2051', and then receive a text inputted by the user based on the presented text query result for use as the digest of the text query result. For example, the user may execute operations, such as copy, paste, and input, on the basis of the presented text query result.

In some implementations, the executing body may perform the digest extracting on the found text query result by various implementations, and use the digest obtained by the extracting the digest of the found text query result as the digest of the text query result. It should be noted that how to performing the digest extracting on a text is a prior art that is widely studied and applied at present. The description will not be repeated here. For example, a digest may be extracting from the text using an attention model, a Pointer-Generator Network, or the like.

Step 2053': generating a voice corresponding to the digest of the text query result using a voice synthesis technology, for use as a second audio.

It should be noted that the voice synthesis technology is a prior art that is widely studied and applied at present. The description will not be repeated here.

Step 2054': sequentially connecting each image and video material resource in the material resource sequence to obtain a second video.

Step 2055': determining the second audio and the second video for use as an audio part and a video part in the generated video respectively.

Figure 4:
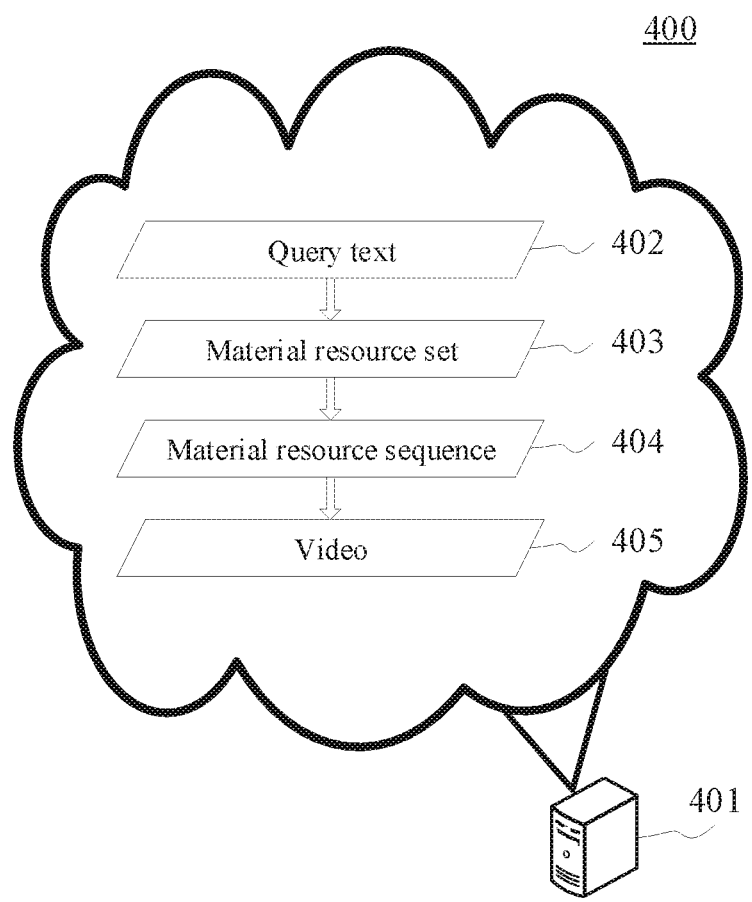
FIG. 4 is a schematic diagram of an application scenario of the method for generating a video according to an embodiment of the present disclosure.

Further referring to FIG. 4, FIG. 4 is a schematic diagram of an application scenario of the method for generating a video according to the present embodiment. In the application scenario of FIG. 4, the server 401 may first receive a query text 402 inputted by a user, then the server 401 may query a material resource set 403 related to the query text 402, then the server 401 may present the material resource set 403, then the server 401 may determine a material resource sequence 404, in response to receiving a selecting operation and a ranking operation of the user on the material resources in the presented material resource set, and finally the server 401 may generate the video 405 based on the material resource sequence 404.

The method according to the above embodiments of the present disclosure first receives a query text inputted by a user, then queries a material resource set related to the query text, material resources being images, videos, or audios, then presents the material resource set, then receives a selecting operation and a ranking operation of the user on the material resources in the presented material resource set, determines a material resource sequence, and finally generates the video based on the material resource sequence, thereby providing the material resources for the user based on the query text inputted by the user, generating the video based on the selecting operation and the ranking operation of the user on the provided material resources, which reduces the costs of generating the video by the user.

Figure 5:
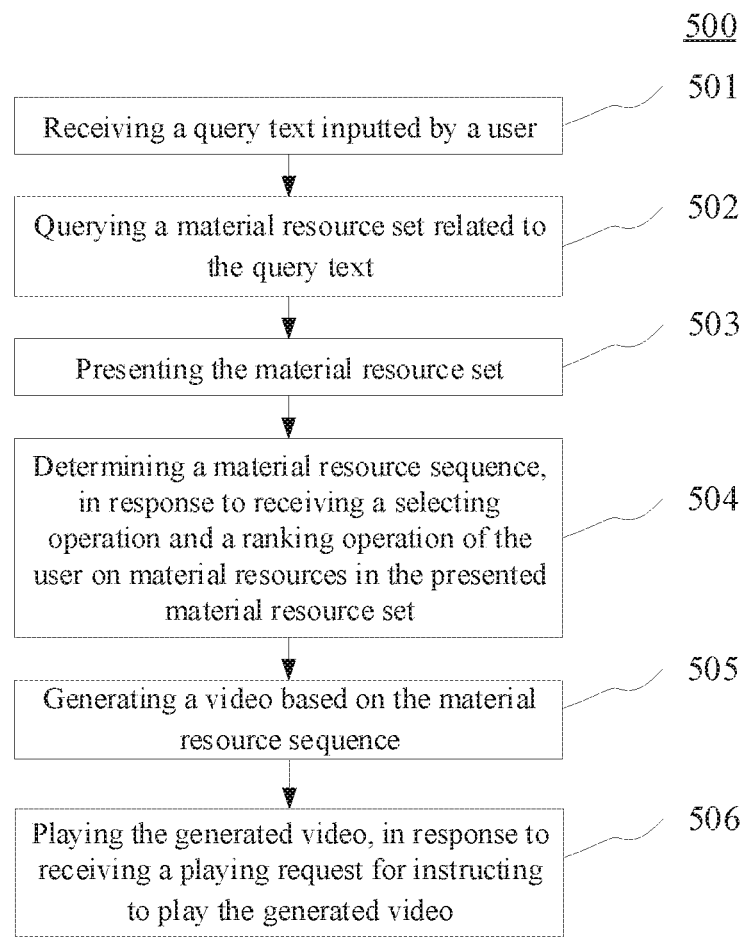
FIG. 5 is a flowchart of the method for generating a video according to another embodiment of the present disclosure.

Further referring to FIG. 5, a process 500 of the method for generating a video according to another embodiment of the present disclosure is shown. The process 500 of the method for generating a video includes the following steps.

Step 501: receiving a query text inputted by a user.

Step 502: querying a material resource set related to the query text.

Step 503: presenting the material resource set.

Step 504: determining a material resource sequence, in response to receiving a selecting operation and a ranking operation of the user on material resources in the presented material resource set.

Step 505: generating a video based on the material resource sequence.

Specific operations of step 501, step 502, step 503, step 504, and step 505 in the present embodiment are basically identical to the operations of step 201, step 202, step 203, step 204, and step 205 in the embodiment shown in FIG. 2. The description will not be repeated here.

Step 506: playing the generated video, in response to receiving a playing request for instructing to play the generated video.

In some alternative implementations of the present embodiment, an executing body (e.g., the server shown in FIG. 1) of the method for generating a video may locally play the generated video, in the case of locally receiving the playing request for instructing to play the generated video.

In some alternative implementations of the present embodiment, in the case of remotely receiving the playing request for instructing to play the generated video from a terminal device connected to the executing body via a network, the executing body may also send the generated video to the terminal device, and control the terminal device to locally play the received video.

As can be seen from FIG. 5, compared with the corresponding embodiment of FIG. 2A, the process 500 of the method for generating a video in the present embodiment additionally provides the playing the generated video in the case of receiving the playing request. Accordingly, the scheme described in the present embodiment may achieve playing the generated video. Then, the user may preview the generated video, may continue to edit the video, and then preview the video again after completing editing the video, thereby reducing the costs of making and editing the video by the user.

Figure 6:
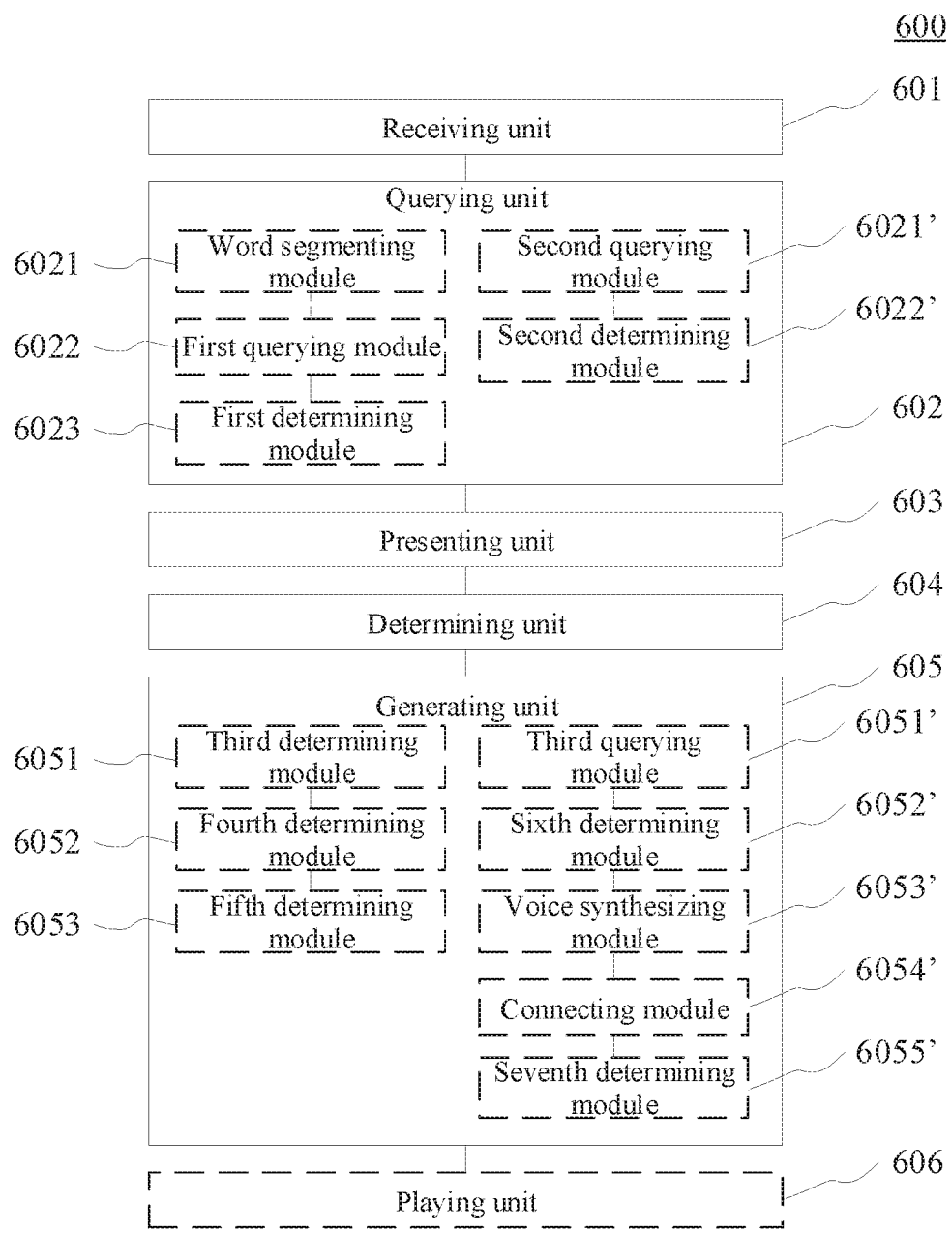
FIG. 6 is a schematic structural diagram of an apparatus for generating a video according to an embodiment of the present disclosure.

Further referring to FIG. 6, as an implementation of the method shown in the above figures, an embodiment of the present disclosure provides an apparatus for generating a video. The embodiment of the apparatus corresponds to the embodiment of the method shown in FIG. 2A. The apparatus may be specifically applied to various electronic devices.

As shown in FIG. 6, the apparatus 600 for generating a video of the present embodiment includes: a receiving unit 601, a querying unit 602, a presenting unit 603, a determining unit 604, and a generating unit 605. The receiving unit 601 is configured to receive a query text inputted by a user; the querying unit 602 is configured to query a material resource set related to the query text, material resources being images, videos, or audios; the presenting unit 603 is configured to present the material resource set; the determining unit 604 is configured to determine a material resource sequence, in response to receiving a selecting operation and a ranking operation of the user on the material resources in the presented material resource set; and the generating unit 605 is configured to generate the video based on the material resource sequence.

The related description of step 201, step 202, step 203, step 204, and step 205 in the corresponding embodiment of FIG. 2A may be referred to for specific processing of the receiving unit 601, the querying unit 602, the presenting unit 603, the determining unit 604, and the generating unit 605 of the apparatus 600 for generating a video and the technical effects thereof in the present embodiment, respectively. The description will not be repeated here.

In some alternative implementations of the present embodiment, the querying unit 602 may include: a word segmenting module 6021 configured to perform word segmentation on the query text to obtain a segmented term sequence corresponding to the query text; a first querying module 6022 configured to query, for a segmented term in the segmented term sequence, a material resource with a matching degree between the material resource and the segmented term greater than a preset matching degree threshold; and a first determining module 6023 configured to determine a found material resource for use as the material resource set.

In some alternative implementations of the present embodiment, the first querying module 6022 may be further configured to: query a material resource with a similarity between a corresponding semantic vector and a term vector of the segmented term greater than a first preset similarity threshold.

In some alternative implementations of the present embodiment, the querying unit 602 may further include: a second querying module 6021' configured to query a material resource with a similarity between a corresponding semantic vector and a semantic vector of the query text greater than a second preset similarity threshold; and a second determining module 6022' configured to determine a found material resource for use as the material resource set.

In some alternative implementations of the present embodiment, the generating unit 605 may include: a third determining module 6051 configured to determine a video obtained by sequentially connecting each image and video material resource in the material resource sequence for use as a first video; a fourth determining module 6052 configured to determine an audio obtained by sequentially connecting each audio material resource in the material resource sequence for use as a first audio; and a fifth determining module 6053 configured to determine the first video and the first audio for use as a video part and an audio part in the generated video respectively.

In some alternative implementations of the present embodiment, the generating unit 605 may further include: a third querying module 6051' configured to query a text query result with the similarity between a corresponding semantic vector and the semantic vector of the query text greater than the second preset similarity threshold; a sixth determining module 6052' configured to determine a digest of the text query result based on the found text query result; a voice synthesizing module 6053' configured to generate a voice corresponding to the digest of the text query result using a voice synthesis technology, for use as a second audio; a connecting module 6054' configured to sequentially connect each image and video material resource in the material resource sequence to obtain a second video; and a seventh determining module 6055' configured to determine the second audio and the second video for use as an audio part and a video part in the generated video respectively.

In some alternative implementations of the present embodiment, the apparatus 600 may further include: a playing unit 606 configured to play the generated video, in response to receiving a playing request for instructing to play the generated video.

It should be noted that the details for implementation and technical effects of the units in the apparatus for generating a video according to some embodiments of the present disclosure may refer to the description of other embodiments in the present disclosure. The description will not be repeated here.

Figure 7:
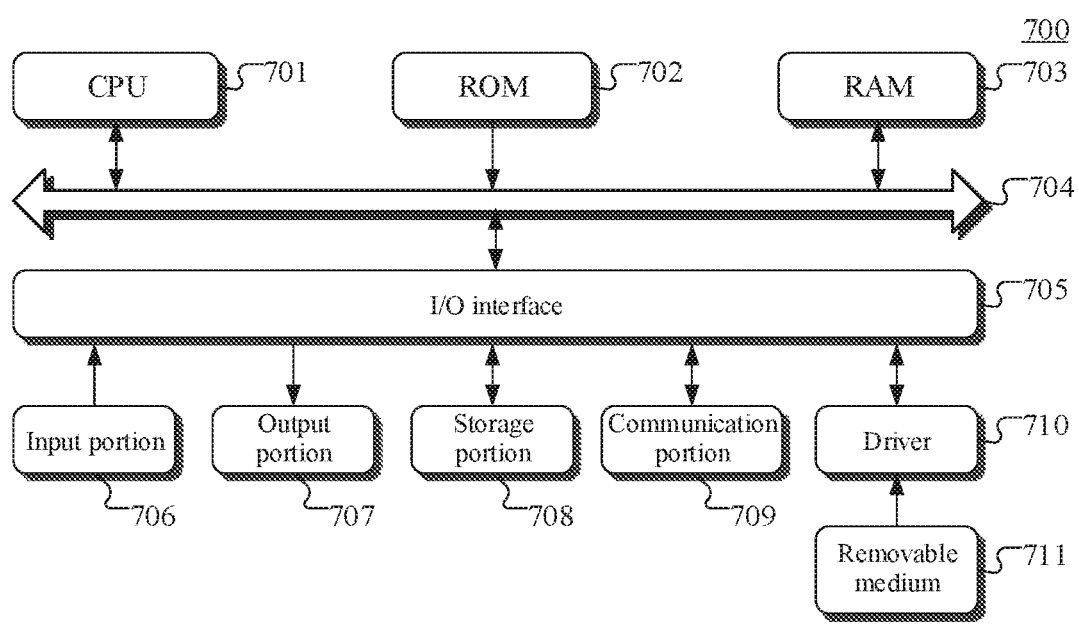
FIG. 7 is a schematic structural diagram of a computer system adapted to implement a server of some embodiments of the present disclosure.

Referring to FIG. 7, a schematic structural diagram of a computer system 700 of a server adapted to implement some embodiments of the present disclosure is shown. The server shown in FIG. 7 is merely an example, and should not limit the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display device (LCD), a speaker, etc.; a storage portion 708 including a hard disk and the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the CPU 701, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by software or hardware. The described units may also be provided in a processor, for example, described as: a processor including a receiving unit, a querying unit, a presenting unit, a determining unit, and a generating unit. The names of these units do not constitute a limitation to such units themselves in some cases. For example, the receiving unit may also be described as "a unit configured to receive a query text inputted by a user."

In another aspect, an embodiment of the present disclosure further provides a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: receive a query text inputted by a user; query a material resource set related to the query text, material resources being images, videos, or audios; present the material resource set; determine a material resource sequence, in response to receiving a selecting operation and a ranking operation of the user on the material resources in the presented material resource set; and generate the video based on the material resource sequence.

In another aspect, an embodiment of the present disclosure provides another server, including: an interface, a storage storing one or more program, and one or processors operatively connected to the interface and the storage and configured to: receive a query text inputted by a user; query a material resource set related to the query text, material resources being images, videos, or audios; present the material resource set; determine a material resource sequence, in response to receiving a selecting operation and a ranking operation of the user on the material resources in the presented material resource set; and generate the video based on the material resource sequence.

In another aspect, an embodiment of the present disclosure provides a computer readable storage medium, storing a computer program thereon, wherein the computer program, when executed by one or more processors, causes the one or more processors to: receive a query text inputted by a user; query a material resource set related to the query text, material resources being images, videos, or audios; present the material resource set; determine a material resource sequence, in response to receiving a selecting operation and a ranking operation of the user on the material resources in the presented material resource set; and generate the video based on the material resource sequence.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a video, comprising:
    receiving a query text inputted by a user;
    querying a material resource set related to the query text, material resources being images, videos, or audios;
    presenting the material resource set;
    determining a material resource sequence, in response to receiving a selecting operation and a ranking operation of the user on the material resources in the presented material resource set; and
    generating the video based on the material resource sequence.

2. The method according to claim 1, wherein the querying a material resource set related to the query text comprises:

performing word segmentation on the query text to obtain a segmented term sequence corresponding to the query text;
querying, for a segmented term in the segmented term sequence, a material resource with a matching degree between the material resource and the segmented term greater than a preset matching degree threshold; and
determining a found material resource for use as the material resource set.

3. The method according to claim 2, wherein the querying a material resource with a matching degree between the material resource and the segmented term greater than a preset matching degree threshold comprises:
querying a material resource with a similarity between a corresponding semantic vector and a term vector of the segmented term greater than a first preset similarity threshold.

4. The method according to claim 1, wherein the querying a material resource set related to the query text comprises:
querying a material resource with a similarity between a corresponding semantic vector and a semantic vector of the query text greater than a second preset similarity threshold; and
determining a found material resource for use as the material resource set.

5. The method according to claim 1, wherein the generating the video based on the material resource sequence comprises:
determining a video obtained by sequentially connecting each image and video material resource in the material resource sequence for use as a first video;
determining an audio obtained by sequentially connecting each audio material resource in the material resource sequence for use as a first audio; and
determining the first video and the first audio for use as a video part and an audio part in the generated video respectively.

6. The method according to claim 1, wherein the generating the video based on the material resource sequence comprises:
querying a text query result with the similarity between a corresponding semantic vector and the semantic vector of the query text greater than a second preset similarity threshold;
determining a digest of the text query result based on a found text query result;
generating a voice corresponding to the digest of the text query result using a voice synthesis technology, for use as a second audio;
sequentially connecting each image and video material resource in the material resource sequence to obtain a second video; and
determining the second audio and the second video for use as an audio part and a video part in the generated video respectively.

7. The method according to claim 1, wherein the method further comprises:
playing the generated video, in response to receiving a playing request for instructing to play the generated video.

8. An apparatus for generating a video, comprising:
at least one processor; and
a memory storing instructions, wherein the instructions when executed by the at least one processor, cause the at least one processor to perform operations, the operations comprising:
receiving a query text inputted by a user;
querying a material resource set related to the query text, material resources being images, videos, or audios;
presenting the material resource set;
determining a material resource sequence, in response to receiving a selecting operation and a ranking operation of the user on the material resources in the presented material resource set; and
generating the video based on the material resource sequence.

9. The apparatus according to claim 8, wherein the querying a material resource set related to the query text comprises:
performing word segmentation on the query text to obtain a segmented term sequence corresponding to the query text;
querying, for a segmented term in the segmented term sequence, a material resource with a matching degree between the material resource and the segmented term greater than a preset matching degree threshold; and
determining a found material resource for use as the material resource set.

10. The apparatus according to claim 9, wherein the querying a material resource with a matching degree between the material resource and the segmented term greater than a preset matching degree threshold comprises:
querying a material resource with a similarity between a corresponding semantic vector and a term vector of the segmented term greater than a first preset similarity threshold.

11. The apparatus according to claim 8, wherein the querying a material resource set related to the query text comprises:
querying a material resource with a similarity between a corresponding semantic vector and a semantic vector of the query text greater than a second preset similarity threshold; and
determining a found material resource for use as the material resource set.

12. The apparatus according to claim 8, wherein the generating the video based on the material resource sequence comprises:
determining a video obtained by sequentially connecting each image and video material resource in the material resource sequence for use as a first video;
determining an audio obtained by sequentially connecting each audio material resource in the material resource sequence for use as a first audio; and
determining the first video and the first audio for use as a video part and an audio part in the generated video respectively.

13. The apparatus according to claim 8, wherein the generating the video based on the material resource sequence comprises:
querying a text query result with the similarity between a corresponding semantic vector and the semantic vector of the query text greater than a second preset similarity threshold;
determining a digest of the text query result based on the found text query result;
generating a voice corresponding to the digest of the text query result using a voice synthesis technology, for use as a second audio;
sequentially connecting each image and video material resource in the material resource sequence to obtain a second video; and determining the second audio and the second video for use as an audio part and a video part in the generated video respectively.

14. The apparatus according to claim 8, wherein the operations further comprise:
 playing the generated video, in response to receiving a playing request for instructing to play the generated video.

15. A non-transitory computer readable storage medium, storing a computer program thereon, wherein the computer program, when executed by one or more processors, causes the one or more processors to perform operations, the operations comprising:
 receiving a query text inputted by a user;
 querying a material resource set related to the query text, material resources being images, videos, or audios;
 presenting the material resource set;
 determining a material resource sequence, in response to receiving a selecting operation and a ranking operation of the user on the material resources in the presented material resource set; and
 generating the video based on the material resource sequence.

16. The non-transitory computer readable storage medium according to claim 15, wherein the querying a material resource set related to the query text comprises:
 performing word segmentation on the query text to obtain a segmented term sequence corresponding to the query text;
 querying, for a segmented term in the segmented term sequence, a material resource with a matching degree between the material resource and the segmented term greater than a preset matching degree threshold; and
 determining a found material resource for use as the material resource set.

17. The non-transitory computer readable storage medium according to claim 16, wherein the querying a material resource with a matching degree between the material resource and the segmented term greater than a preset matching degree threshold comprises:
 querying a material resource with a similarity between a corresponding semantic vector and a term vector of the segmented term greater than a first preset similarity threshold.

18. The non-transitory computer readable storage medium according to claim 15, wherein the querying a material resource set related to the query text comprises:
 querying a material resource with a similarity between a corresponding semantic vector and a semantic vector of the query text greater than a second preset similarity threshold; and
 determining a found material resource for use as the material resource set.

19. The non-transitory computer readable storage medium according to claim 15, wherein the generating the video based on the material resource sequence comprises:
 determining a video obtained by sequentially connecting each image and video material resource in the material resource sequence for use as a first video;
 determining an audio obtained by sequentially connecting each audio material resource in the material resource sequence for use as a first audio; and
 determining the first video and the first audio for use as a video part and an audio part in the generated video respectively.

20. The non-transitory computer readable storage medium according to claim 15, wherein the generating the video based on the material resource sequence comprises:
 querying a text query result with the similarity between a corresponding semantic vector and the semantic vector of the query text greater than a second preset similarity threshold;
 determining a digest of the text query result based on the found text query result;
 generating a voice corresponding to the digest of the text query result using a voice synthesis technology, for use as a second audio;
 sequentially connecting each image and video material resource in the material resource sequence to obtain a second video; and
 determining the second audio and the second video for use as an audio part and a video part in the generated video respectively.

\* \* \* \* \*

UNITED STATES PATENT AND TRADEMARK OFFICE
CERTIFICATE OF CORRECTION

PATENT NO. : 10,910,014 B2
APPLICATION NO. : 16/703717
DATED : February 2, 2021
INVENTOR(S) : Hao Tian et al.

Page 1 of 1

It is certified that error appears in the above-identified patent and that said Letters Patent is hereby corrected as shown below:

On the Title Page

Item (72) Inventors:
"Darning Lu, Sunnyvale, CA (US)" should read --Daming Lu, Sunnyvale, CA (US)--.
"Jeff Chienyu Wang, Sunnyvale, CA (US)" should read --Jeff ChienYu Wang, Sunnyvale, CA (US)--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*